No. 802,445. PATENTED OCT. 24, 1905.
T. EVANS.
FISH HOOK.
APPLICATION FILED AUG. 28, 1903.

Witnesses:
Harry T. P. Gee.
C. Gordon Warren.

Inventor:
Thomas Evans.
By Arthur H. Stanley
Attorney.

UNITED STATES PATENT OFFICE.

THOMAS EVANS, OF MORRISTON, NEAR SWANSEA, ENGLAND.

FISH-HOOK.

No. 802,445.      Specification of Letters Patent.      Patented Oct. 24, 1905.

Application filed August 28, 1903. Serial No. 171,116.

*To all whom it may concern:*

Be it known that I, THOMAS EVANS, of 18 Springfield Terrace, Morriston, near Swansea, in the county of Glamorgan, Wales, England, have invented certain new and useful Improvements in Fish-Hooks, of which the following is a specification.

This present invention consists of a fish-hook suitable for bait, worm, or fly fishing and adaptable for river, sea, or any other water. It is an improvement over the former types of hooks in some or all of the following particulars: First, the worm or other bait can be applied with ease to the hook; secondly, the hook can be disgorged from the fish with scarcely any difficulty; thirdly, the hook takes a firm hold of the fish; fourthly, it is exceedingly compact, enabling it to be dropped among brambles in most difficult places and drawn up without entanglement; fifthly, it is invisible when baited, and, sixthly, it is sufficiently heavy to partly or wholly obviate the necessity of using shot or any other weights for keeping it down in the water.

The special feature of the hook is the pivoting of a small lever upon a pin in such a manner that the lever, which is preferably barbed, may respond directly to the attack of the fish by swinging outward, and thus securing the prey, the whole therefore constituting a more sensitive and profitable hook than the kinds heretofore employed.

The accompanying drawings, which illustrate my invention on a greatly-enlarged scale, will now be referred to, the same letters of reference in the several figures indicating the same or corresponding parts of the hook.

Figures 1, 2, 3, 4:
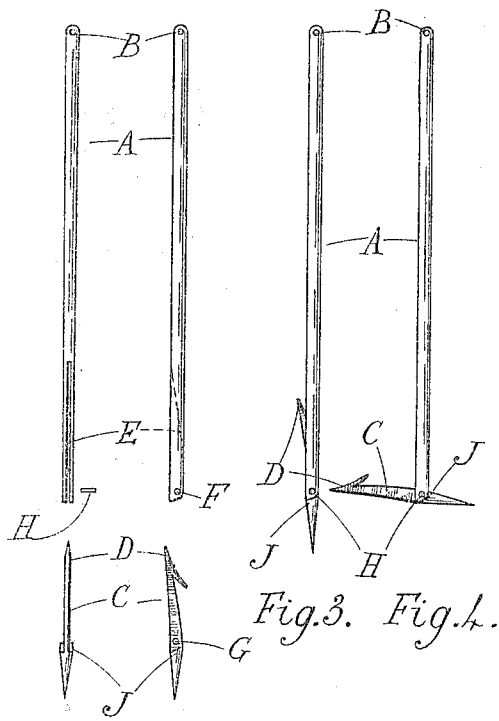
Figures 5, 6, 7, 8:
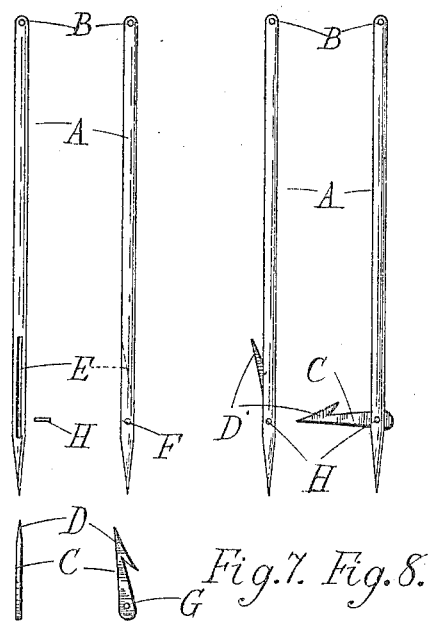

Figures 1 and 2 are a front view and side view, respectively, of my invention, a piece of the lower end, however, being shown detached. Fig. 3 shows the complete hook in side view, the parts being in the position for being baited. Fig. 4 shows the same in the position it would take up when the fish is caught. Figs. 5, 6, 7, and 8 are views identical with Figs. 1, 2, 3, and 4, but showing a slight modification.

My invention comprises a steel or other metal pin A, which may have an eye B at its upper end for fastening the line to, the latter being usually of gut; but this may be bound on in the usual way, if preferred. A small lever C is hinged at or near the lower end of the pin A in any suitable manner, instances of which are shown in the drawings, the lever having a barb D at one end in Figs. 1 to 8.

Referring to Figs. 1 to 4, the pin A has an open slot E at the bottom and a hole F in each of the sides of the slot. The barbed lever C has a pivotal hole G near its center, at which part it is held within the slot E by a pivot H. The slot E is continued some distance upwardly, if desired, through only a part of the thickness of the pin, so as to afford a housing for the barb and upper part of the lever when raised and permit the other end of the lever to be virtually a continuation of the pin A, terminating in a sharp point, as seen in Fig. 3. The lever C is formed with a shoulder or thickened portion J, acting as a stop to prevent its opening farther than shown in Fig. 4.

Referring to Figs. 5 to 8, the pin A is itself sharpened, and the slot E is a closed one, situated a little distance from the point. The lever C in this case is pivoted almost at its extreme end, as shown, coming to a stop when opened against the end of the slot.

When the fish has been caught, the hook should be pressed in a little farther, when the lever will tend to close up against the pin and the hook will come out quite easily.

It is obvious that the lever aforesaid may be simply pointed and slightly bent instead of being barbed and that it can be pivoted to the pin A in other ways than those shown—as, for example, to a flattened part of the pin, dispensing with the slot E—and the invention may be otherwise modified as regards mere detail without departing from its essential nature.

Having thus described my said invention, I declare that what I claim, and wish to secure by Letters Patent, is—

A fish-hook comprising in combination a pin A, a portion of which is slotted at its lower extremity at E, said slot being of equal width throughout and extending at its lower part entirely through the thickness of the pin and at its remaining part only partially through said thickness in the form of a wedge-shaped groove, a pivot H within said pin and extending across the open part of said slot and an arm C upon said pivot.

In witness whereof I have hereunto set my hand in the presence of two witnesses.

THOMAS EVANS.

Witnesses:
    ARTHUR STUCLEY TRISTRAM LUCAS,
    BERNARD JOHN MINERS.